(12) United States Patent
Akkarakaran et al.

(10) Patent No.: US 11,290,145 B2
(45) Date of Patent: *Mar. 29, 2022

(54) DATA TRANSMISSION IN SYNCHRONIZATION SLOTS

(71) Applicant: QUALCOMM Incorporated, San Diego, CA (US)

(72) Inventors: Sony Akkarakaran, Poway, CA (US); Tao Luo, San Diego, CA (US); Xiao Feng Wang, San Diego, CA (US); Makesh Pravin John Wilson, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/198,837

(22) Filed: Mar. 11, 2021

(65) Prior Publication Data

US 2021/0203377 A1 Jul. 1, 2021

Related U.S. Application Data

(63) Continuation of application No. 15/910,449, filed on Mar. 2, 2018, now Pat. No. 11,025,293.

(Continued)

(51) Int. Cl.
*H04B 1/7075* (2011.01)
*H04B 7/212* (2006.01)
(Continued)

(52) U.S. Cl.
CPC .......... *H04B 1/7075* (2013.01); *H04B 7/208* (2013.01); *H04B 7/2125* (2013.01);
(Continued)

(58) Field of Classification Search
CPC .... H04B 1/7075; H04B 7/2125; H04B 7/208; H04B 7/2656; H04B 17/309; H04B 17/24;
(Continued)

(56) References Cited

U.S. PATENT DOCUMENTS 8,233,428 B2 7/2012 Ernstrom et al.
10,492,157 B2 11/2019 Nam et al.
(Continued)

FOREIGN PATENT DOCUMENTS

CN 101009510 A 8/2007
CN 104113387 A 10/2014
(Continued)

OTHER PUBLICATIONS

Convida Wireless: "Discussion on Paging for NR", 3GPP Draft; R1-1702583_Discussion_on_Paging, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 13, 2017-Feb. 17, 2017 Feb. 12, 2017, XP051209737, Retrieved from the Internet: URL:http://www.3gpp.org/ftp/Meetings_3GPP_SYNC/RAN1/Docs/c[retrieved on Feb. 12, 2017], 4 pages.

(Continued)

*Primary Examiner* — Kabir A Timory
(74) *Attorney, Agent, or Firm* — Patterson + Sheridan, L.L.P.

(57) ABSTRACT

Certain aspects of the present disclosure relate to methods and apparatus for data transmission in synchronization slots. A method for use by a base station for data transmission in synchronization slots includes transmitting a synchronization signal (SS) burst, wherein different SS blocks of the burst are transmitted using different transmit beams and performing frequency division multiplexing (FDM) or time (Continued)

division multiplexing (TDM) to include one or more other types of signals that need to be multicast and are also transmitted using the different transmit beams.

25 Claims, 10 Drawing Sheets

Related U.S. Application Data

(60) Provisional application No. 62/467,746, filed on Mar. 6, 2017.

(51) Int. Cl.
| | | |
|---|---|---|
| H04B 7/208 | (2006.01) | |
| H04B 7/26 | (2006.01) | |
| H04W 52/32 | (2009.01) | |
| H04W 52/16 | (2009.01) | |
| H04W 52/42 | (2009.01) | |
| H04L 5/00 | (2006.01) | |
| H04W 52/14 | (2009.01) | |
| H04W 52/24 | (2009.01) | |
| H04B 17/309 | (2015.01) | |
| H04B 17/24 | (2015.01) | |

(52) U.S. Cl.
CPC ......... *H04B 7/2656* (2013.01); *H04L 5/0023* (2013.01); *H04L 5/0048* (2013.01); *H04W 52/143* (2013.01); *H04W 52/16* (2013.01); *H04W 52/247* (2013.01); *H04W 52/327* (2013.01); *H04W 52/42* (2013.01); *H04B 17/24* (2015.01); *H04B 17/309* (2015.01); *H04L 5/0053* (2013.01)

(58) Field of Classification Search
CPC ... H04W 52/327; H04W 52/16; H04W 52/42; H04W 52/143; H04W 52/247; H04L 5/0048; H04L 5/0023; H04L 5/0053
See application file for complete search history.

(56) References Cited

U.S. PATENT DOCUMENTS

| | | |
|---|---|---|
| 2013/0044621 A1 | 2/2013 | Jung et al. |
| 2013/0286960 A1 | 10/2013 | Li et al. |
| 2014/0010131 A1 | 1/2014 | Gaal et al. |
| 2015/0245227 A1 | 8/2015 | Patel et al. |
| 2016/0308637 A1 | 10/2016 | Frenne et al. |
| 2017/0201968 A1 | 7/2017 | Nam et al. |
| 2017/0238292 A1 | 8/2017 | Rico et al. |
| 2017/0367069 A1* | 12/2017 | Agiwal ............... H04W 68/005 |
| 2018/0035396 A1 | 2/2018 | Stirling-Gallacher et al. |
| 2018/0192383 A1 | 7/2018 | Nam et al. |
| 2018/0254796 A1 | 9/2018 | Akkarakaran et al. |
| 2019/0349960 A1 | 11/2019 | Li et al. |

FOREIGN PATENT DOCUMENTS

| | | |
|---|---|---|
| WO | 2011054003 A1 | 5/2011 |
| WO | 2016182602 A1 | 11/2016 |
| WO | 2017044144 A1 | 3/2017 |
| WO | 2017131806 A1 | 8/2017 |
| WO | 2018144873 A1 | 8/2018 |

OTHER PUBLICATIONS

Huawei et al., "Discussion on SS Burst Set Composition and SS Block Time Index Indication", 3GPP Draft; R1-1703353, 3rd Generation Partnership Project (3GPP), Mobile Competence Centre; 650, Route Des Lucioles F-06921 Sophia-Antipolis Cedex; France vol. RAN WG1 Meeting #88, Athens, Greece, Feb. 13, 2017-Feb. 17, 2017 Feb. 12, 2017 (Feb. 12, 2017), XP051210483, pp. 1-7, Retrieved from the Internet: URL:http://www.3gpp.org/ftp/Meetings_3GPP SYNC/RAN1/Docs/ [retrieved on Feb. 12, 2017].
Huawei et al., "Remaining System Information Delivery for NR", 3GPP TSG RAN WG1 Meeting #88, R1-1703354, Athens, Greece, Feb. 13-17, 2017, 4 Pages.
Huawei et al., "WF on Multiplexing of Paging and SS Block", 3GPP TSG RAN WG1 Meeting #88, R1-1703826, Athens, Greece, Feb. 13-17, 2017, 3 Pages.
International Preliminary Report on Patentability—PCT/US2018/020801, The International Bureau of WIPO—Geneva, Switzerland, Sep. 19, 2019.
International Search Report and Written Opinion—PCT/US2018/020801—ISA/EPO—dated Aug. 21, 2018.
Partial International Search Report—PCT/US2018/020801—ISA/EPO—dated Jun. 7, 2018.
Zte et al., "Paging in NT", 3GPP Draft; 3GPP TSG RAN WG1 #88, R1-1701579, 3rd Generation Partnership Project (3GPP), Mobile Competence Centre; 650, Route Des Lucioles; F-06921, Sophia-Antipolis Cedex; France, RAN WG1, No. Athens, Greece; Feb. 13, 2017-Feb. 17, 2017 Feb. 12, 2017, XP051208746, Retrieved from the Internet: URL: http://www.3gpp.org/ftp/Meetings_3GPP_SYNC/RAN1/Docs/ [retrieved on Feb. 12, 2017], 7 pages.
Taiwan Search Report—TW107107180—TIPO—dated Jun. 13, 2021.

\* cited by examiner

DATA TRANSMISSION IN SYNCHRONIZATION SLOTS

CROSS-REFERENCE TO RELATED APPLICATIONS

This application is a continuation of U.S. patent application Ser. No. 15/910,449, filed on Mar. 2, 2018, which claims the benefit of and priority to U.S. Provisional Patent Application No. 62/467,746, filed Mar. 6, 2017. The entire contents of each of these applications are hereby incorporated by reference in their entirety.

FIELD

The present disclosure relates generally to communication systems, and more particularly, to methods and apparatus for data transmission in synchronization slots.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, eNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a desire for further improvements in NR technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communications by a base station (BS). The method generally includes transmitting a synchronization signal (SS) burst, wherein different SS blocks of the burst are transmitted using different transmit beams and performing frequency division multiplexing (FDM) to include, with the SS burst, one or more other types of signals that are also transmitted using different transmit beams.

Certain aspects provide a method for wireless communications by a user equipment (UE). The method generally includes receiving a synchronization signal (SS) burst, wherein different SS blocks of the burst are transmitted using different transmit beams and receiving within the SS burst other types of signals that are also transmitted using different transmit beams, wherein the one or more other types of signals are included in the SS burst using frequency division multiplexing (FDM).

Certain aspects provide a method for wireless communications by a BS. The method generally includes transmitting a synchronization signal (SS) burst, wherein different SS blocks of the burst are transmitted using different transmit beams and performing time division (TDM) to include, within a duration of an SS burst or in a separate duration, one or more other types of signals that are also transmitted using different transmit beams.

Certain aspects provide a method for wireless communications by a UE. The method generally includes receiving a synchronization signal (SS) burst, wherein different SS blocks of the burst are transmitted using different transmit beams and receiving within the SS burst one or more other types of signals that are also transmitted using different transmit beams, wherein the one or more other types of signals are included in a duration of the SS burst or in a separate duration by performing time division (TDM) to include.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims.

The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
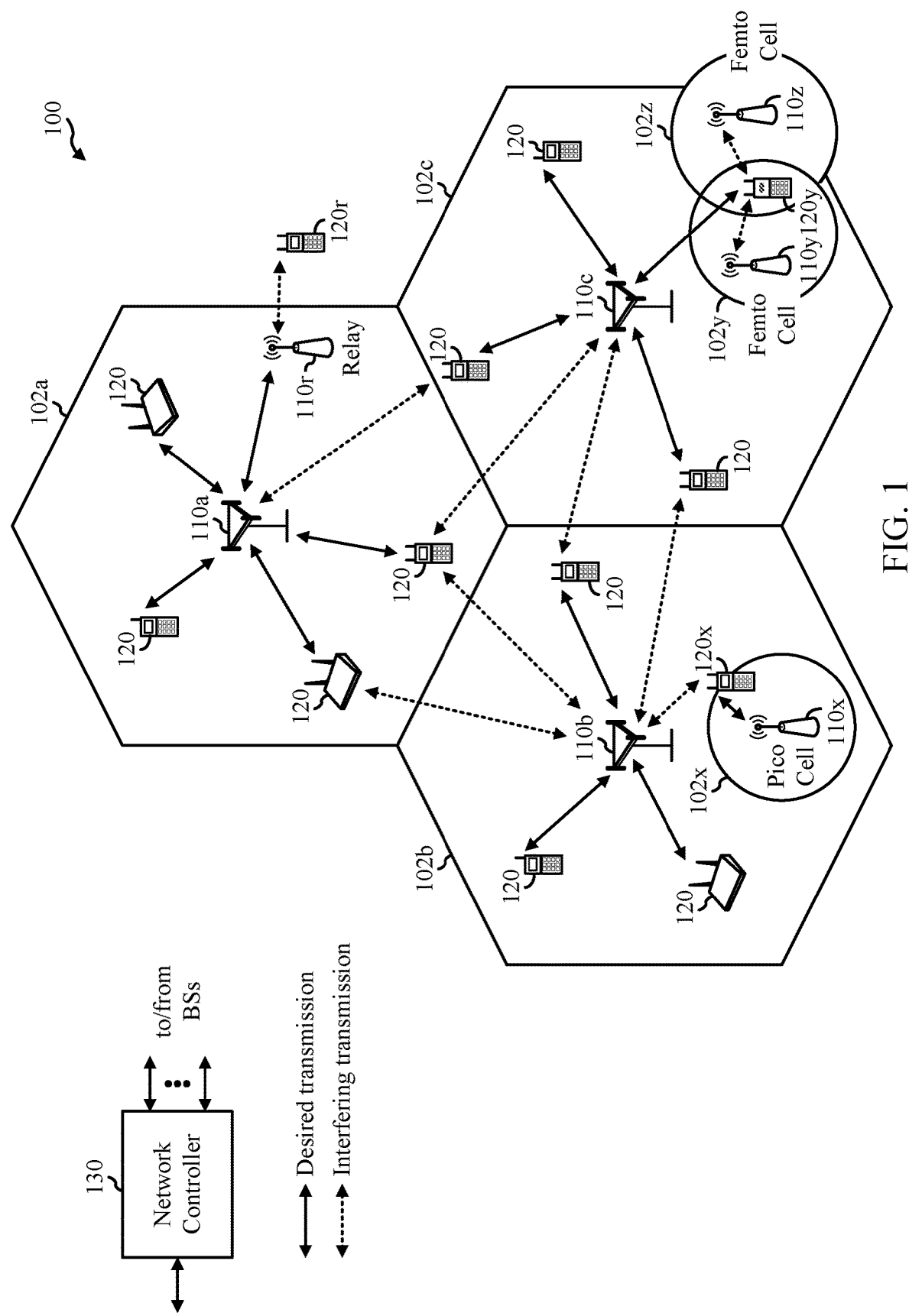
FIG. 1 is a block diagram conceptually illustrating an example telecommunications system, in accordance with certain aspects of the present disclosure.

Aspects of the present disclosure relate to methods and apparatus for data transmission in synchronization slots.

Aspects of the present disclosure provide apparatus, methods, processing systems, and computer readable mediums for new radio (NR) (new radio access technology or 5G technology).

NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

As described further below, under 3GPP's 5G wireless communication standards, a certain structure has been defined for NR synchronization (sync) channels (or NR-SS). More specifically, a set of consecutive orthogonal frequency division multiplexing (OFDM) symbols carrying different types of sync channels (e.g. primary synchronization signal (PSS), secondary synchronization signal (SSS), tertiary synchronization signal (TSS), physical broadcast channel (PBCH)) forms a synchronization signal block (SS-block). In some cases, different SS-blocks may be transmitted by a base station (e.g., BS 110) on different beams to achieve beam-sweeping for sync channels, which may be used by a UE (e.g., UE 120) to quickly identify and acquire a cell. As such, one or more of the channels in an SS-Block may be used for measurements. In some cases, the SS-blocks may be multiplexed (e.g., using frequency division multiplexing or time division multiplexing) with other channels, which may similarly need to be multicast or beam-swept with NR-SS. However, in some cases, applying multiplexing to an intermittently transmitted channel (e.g., paging etc.) with NR-SS may cause intermittent changes to the NR-SS power, which may affect the cell quality measurements by the UE or lead to some performance issues. Accordingly, certain embodiments described herein are directed to eliminating or mitigating the impact of signal power fluctuations on cell quality measurements or other performance aspects when NR-SS blocks are multiplexed with other channels.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100, such as a new radio (NR) or 5G network, in which aspects of the present disclosure may be performed.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and eNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may be coupled to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices. In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., eNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
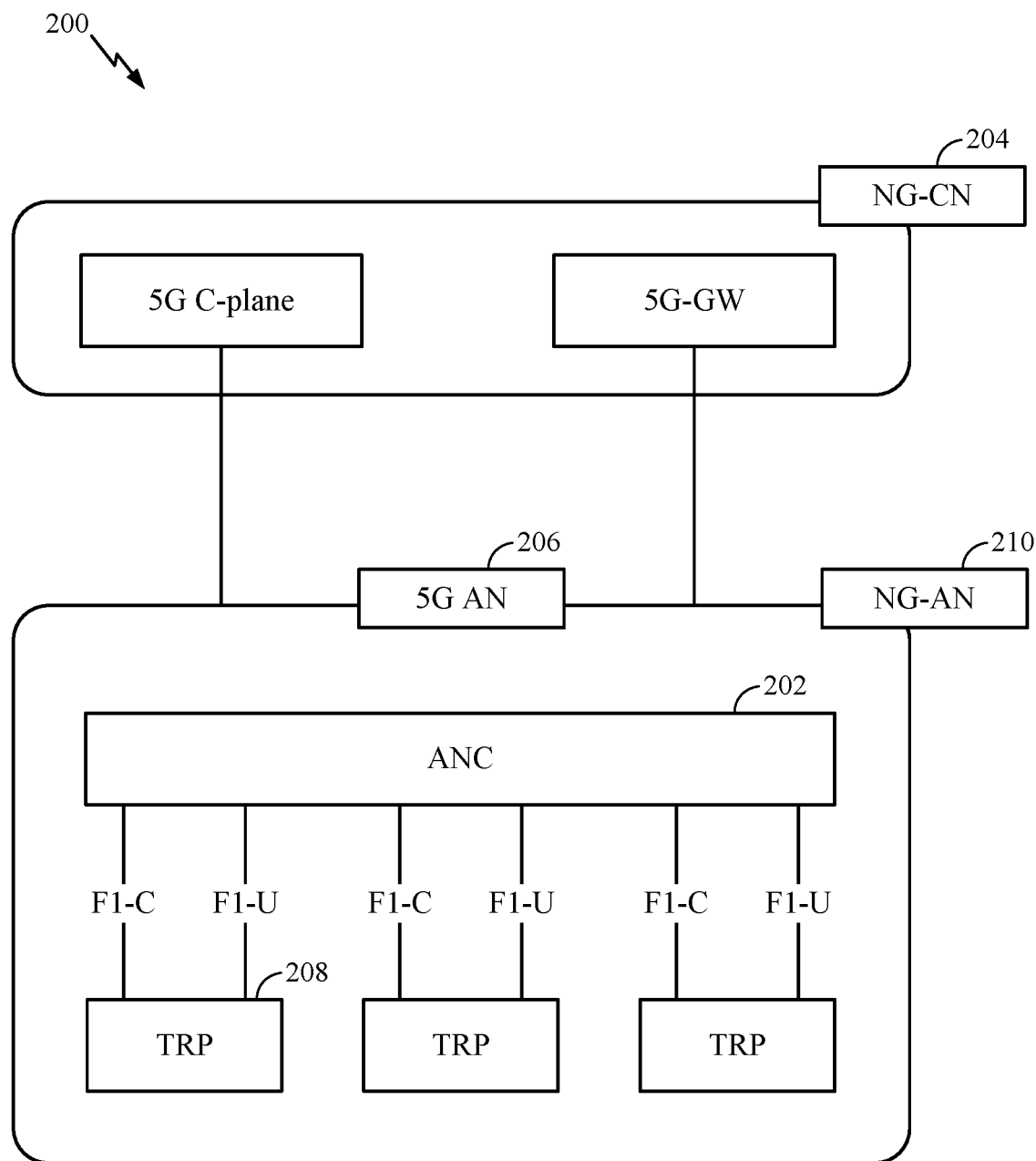
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
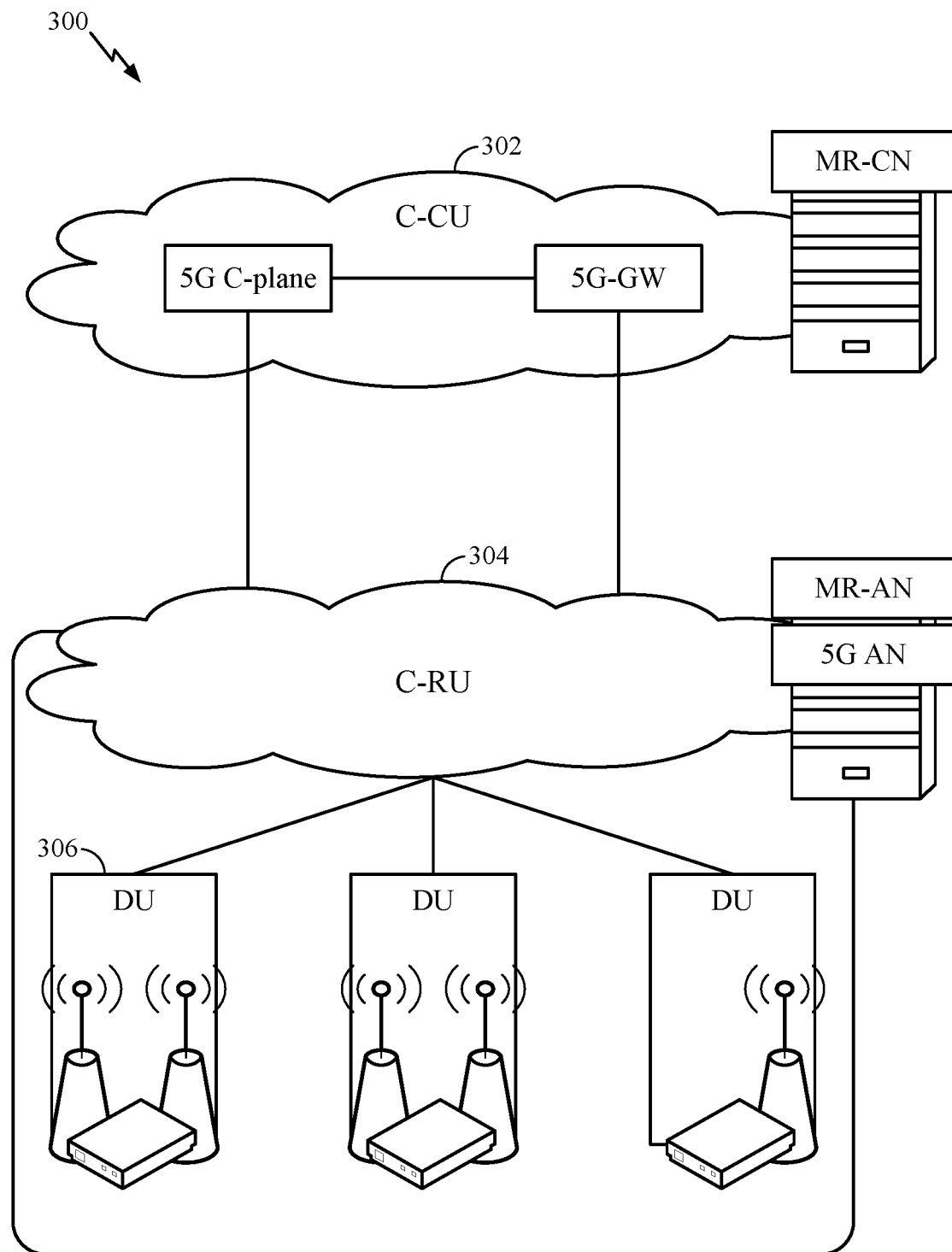
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
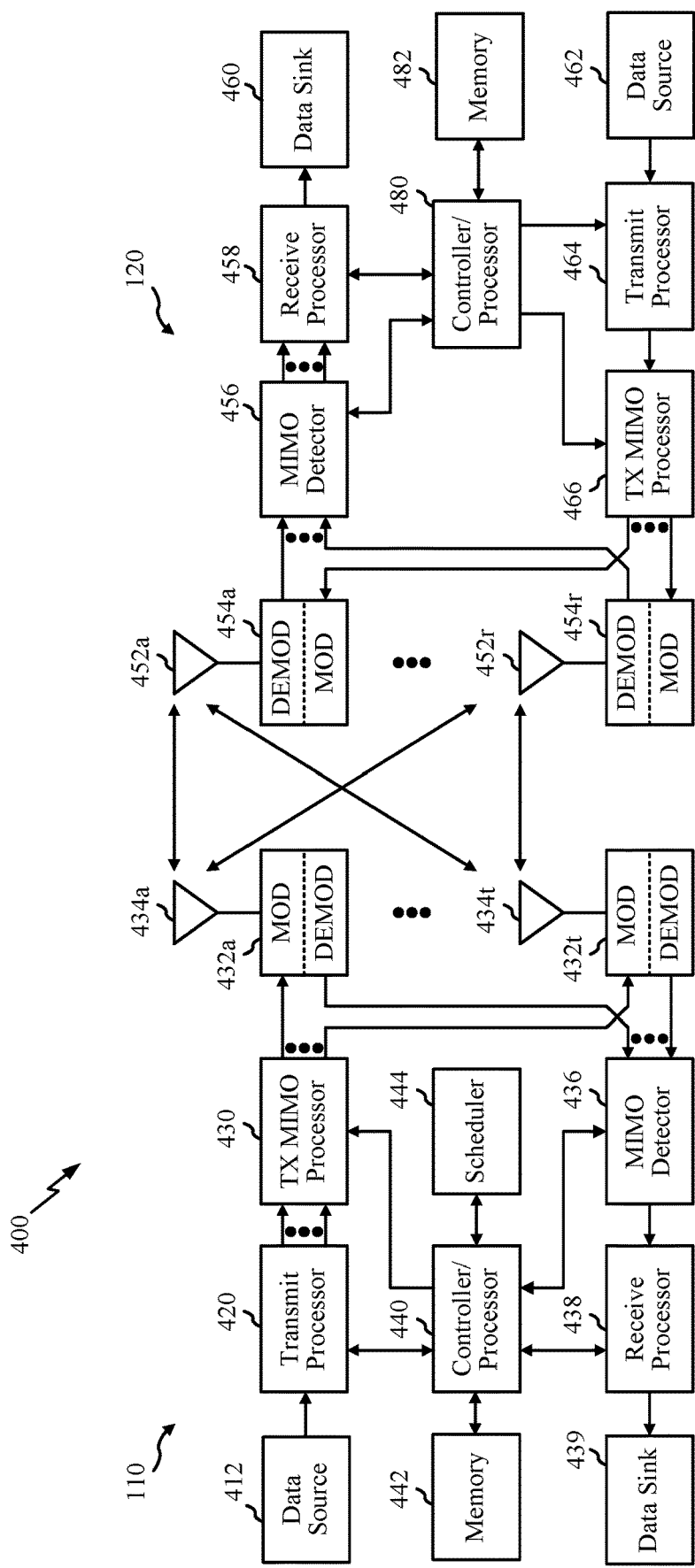
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations described herein and illustrated with reference to FIGS. 8-11.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. For example, the TX MIMO processor 430 may perform certain aspects described herein for RS multiplexing. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. For example, MIMO detector 456 may provide detected RS transmitted using techniques described herein. A receive processor 458 may process (e.g., demodulate, deinterleave, and decode) the detected symbols, provide decoded data for the UE 120 to a data sink 460, and provide decoded control information to a controller/processor 480. According to one or more cases, CoMP aspects can include providing the antennas, as well as some Tx/Rx functionalities, such that they reside in distributed units. For example, some Tx/Rx processings can be done in the central unit, while other processing can be done at the distributed units. For example, in accordance with one or more aspects as shown in the diagram, the BS mod/demod 432 may be in the distributed units.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH)) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of the functional blocks illustrated in FIGS. 8-11, and/or other processes for the techniques described herein. The processor 480 and/or other processors and modules at the UE 120 may also perform or direct processes for the techniques described herein. The memories 442 and 482 may store data and program codes for the BS 110 and the UE 120, respectively. A scheduler 444 may schedule UEs for data transmission on the downlink and/or uplink.

Figure 5:
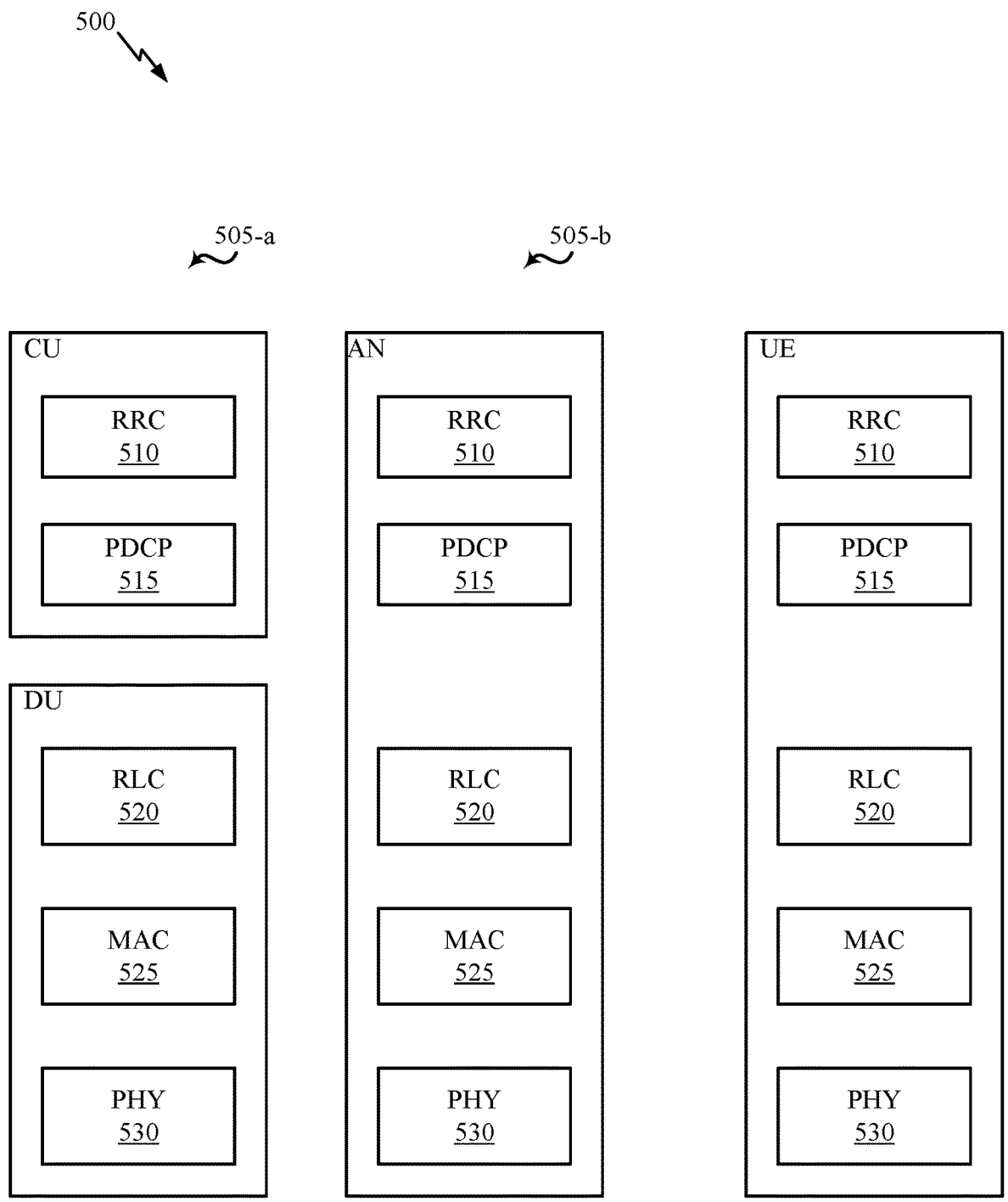
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
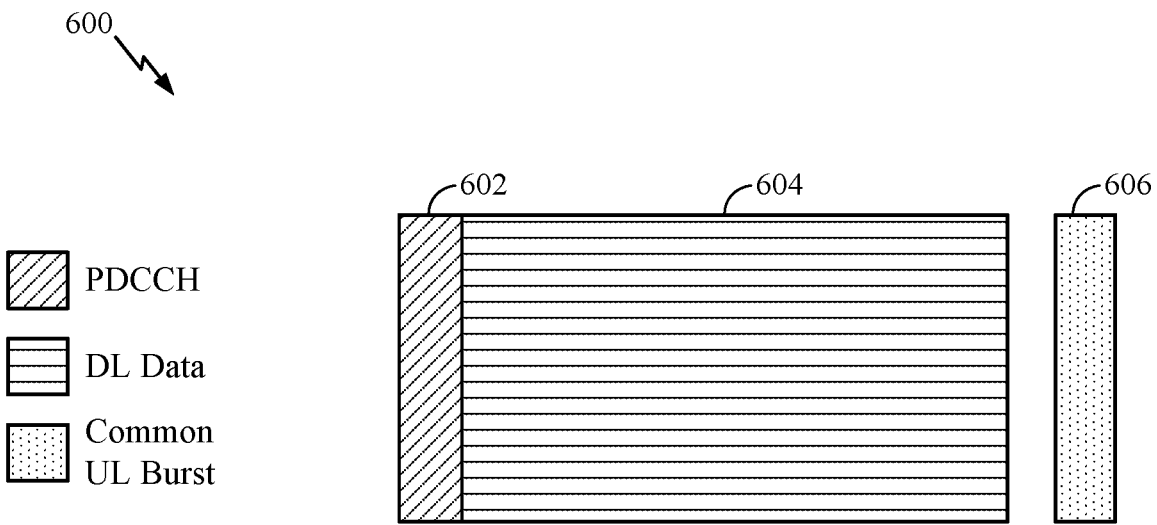
FIG. 6 illustrates an example of a DL-centric subframe, in accordance with certain aspects of the present disclosure.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
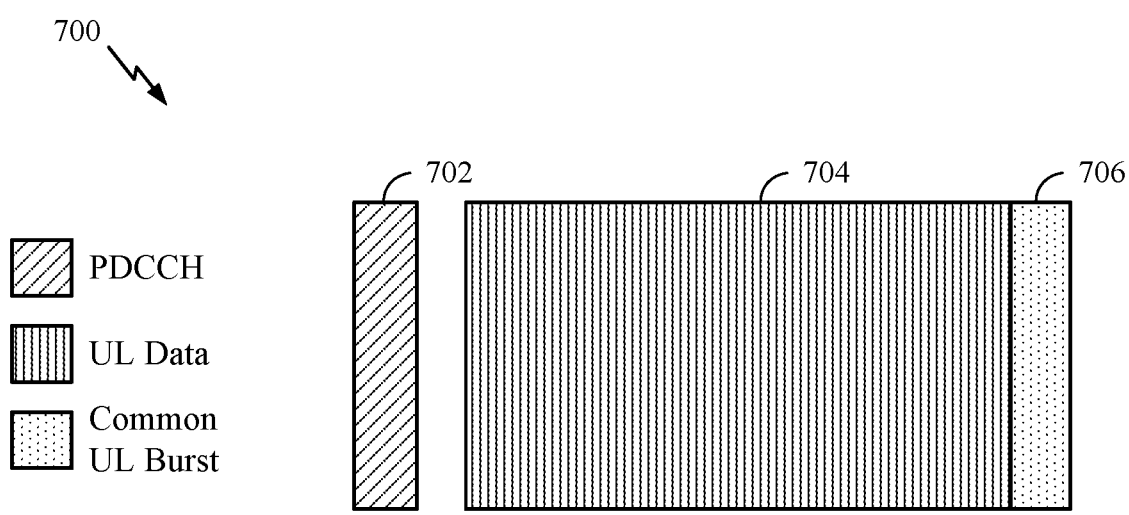
FIG. 7 illustrates an example of an UL-centric subframe, in accordance with certain aspects of the present disclosure.

FIG. 7 is a diagram 700 showing an example of an UL-centric subframe. The UL-centric subframe may include a control portion 702. The control portion 702 may exist in the initial or beginning portion of the UL-centric subframe. The control portion 702 in FIG. 7 may be similar to the control portion described above with reference to FIG. 6. The UL-centric subframe may also include an UL data portion 704. The UL data portion 704 may sometimes be referred to as the payload of the UL-centric subframe. The UL data portion may refer to the communication resources utilized to communicate UL data from the subordinate entity (e.g., UE) to the scheduling entity (e.g., UE or BS). In some configurations, the control portion 702 may be a physical DL control channel (PDCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 706 described above with reference to FIG. 7. The common UL portion 706 may additionally or alternatively include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Data Transmission in Synchronization Slots

Under 3GPP's 5G wireless communication standards, a certain structure has been defined for NR synchronization (sync) channels (or NR-SS). Under 5G, a set of consecutive OFDM symbols carrying different types of sync channels (e.g. PSS, SSS, TSS, PBCH) forms an SS-block. In some cases, a set of one or more SS-blocks may form an SS-burst. In addition, different SS-blocks may be transmitted on different beams to achieve beam-sweeping for sync channels, which may be used by a UE to quickly identify and acquire a cell. Further, one or more of the channels in an SS-block may be used for measurements. Such measurements may be used for various purposes such as radio link monitoring (RLM), beam management, etc. For example, a UE may measure the cell quality and report the quality back in the form of a measurement report, which may be used by the base station for beam management and other purposes.

As discussed above, the NR sync channels may be beam-swept to assure that all the UEs, regardless of their location which may be unknown to the base station, receive the sync channels. In some cases, the Frequency Multiplexing Division (FDM) technique may be applied to other channels, which may similarly need to be beam-swept with NR-SS. For example, such channels may need to be multicast (i.e., sent to an identified group of UEs) or broadcast (i.e., sent to all UEs). Accordingly, in some cases, a sync slot consisting of several SS-blocks may include both the NR sync channels as well as other channels. Examples of channels which may similarly need to be beam-swept with NR-SS is the physical downlink shared channel (PDSCH) and the physical downlink control channel (PDCCH). In some embodiments, PDSCH may be FDM'ed with NR-SS while PDCCH may be TDM'ed with the NR-SS. In some other embodiments, both PDSCH and PDCCH may be FDM'ed with NR-SS. In some embodiments, various types of signals may be transmitted in PDSCH that is FDM'ed with NR-SS. An example of such signals may include a paging indicator channel or paging channel, sent to idle UEs for which the beam direction is not known may also be beam-swept. Another example of such signals is the remaining minimum system information (RMSI), which similar to the paging channel, may be transmitted in the PDSCH.

However, in some cases, applying FDM to an intermittently transmitted channel with NR-SS may cause intermittent changes to the NR-SS power, which may affect the cell quality measurements or lead to some performance issues. For example, in some cases, paging may not always be present in the same slot with NR-SS because there may be no UE to be paged in such a slot. In such embodiments, all the signal power may be used for the sync channel. In other cases, however, paging may be present in the same slot as the sync channel and, therefore, the signal power may be shared between the FDM'ed channels. Therefore, the cell quality measurement may vary based on whether or not, for example, paging exists in the slot where NR-SS is being transmitted.

Accordingly, certain embodiments described herein may provide a number of techniques for eliminating or mitigating the impact of signal power fluctuations on cell quality measurements or other performance aspects.

Figure 8:
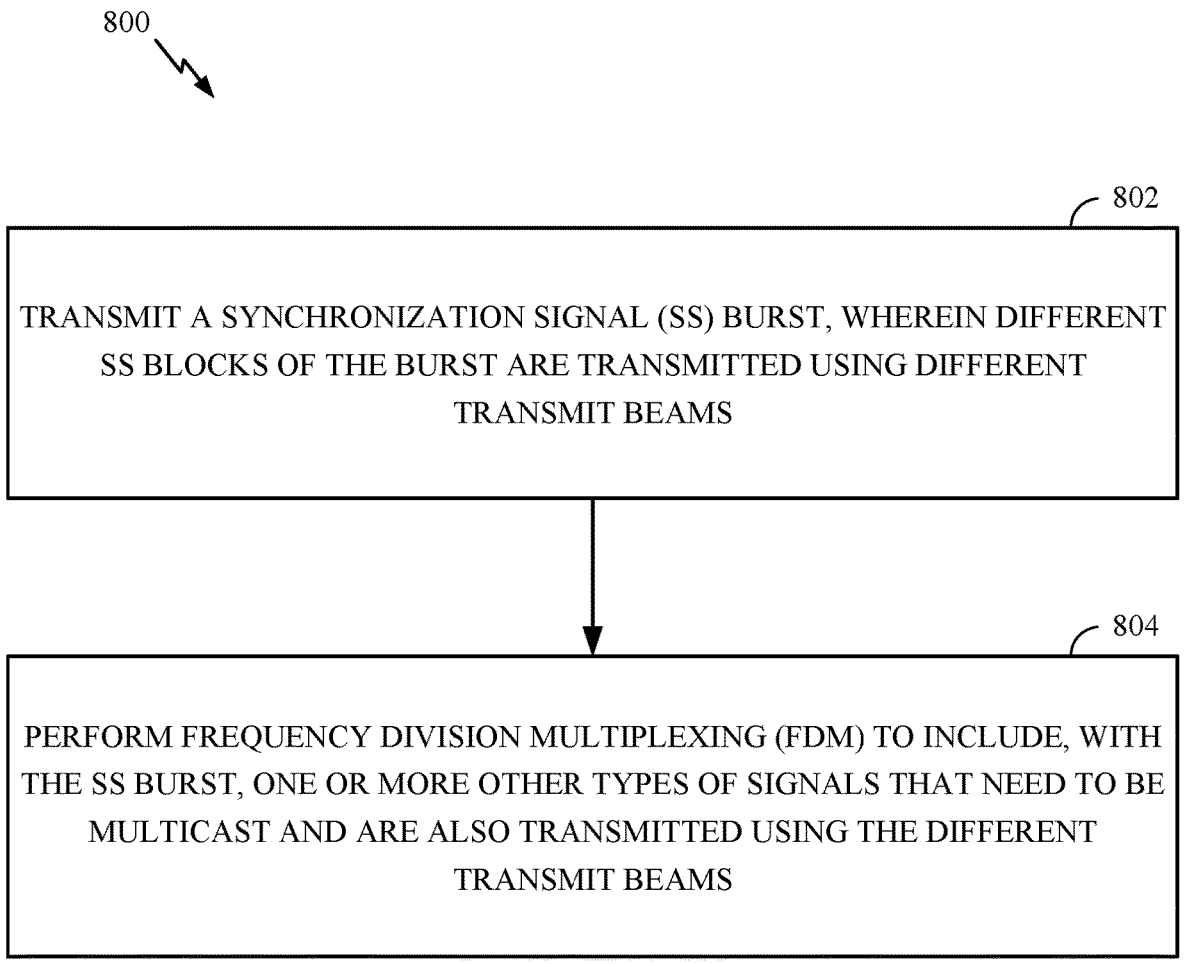
FIG. 8 illustrates example operations for a base station transmitting frequency division multiplexing (FDM) data within synchronization signal (SS) bursts, in accordance with certain aspects of the present disclosure.

FIG. 8 illustrates example operations for a base station transmitting FDM data within synchronization signal (SS) bursts, in accordance with certain aspects of the present disclosure. Operations 800 begin, at 802, by transmitting a synchronization signal (SS) burst, wherein different SS blocks of the burst are transmitted using different transmit beams. At 804, operations 800 continue by performing frequency division multiplexing (FDM) to include, with the SS burst, one or more other types of signals that need to be multicast and are also transmitted using different transmit beams.

Figure 9:
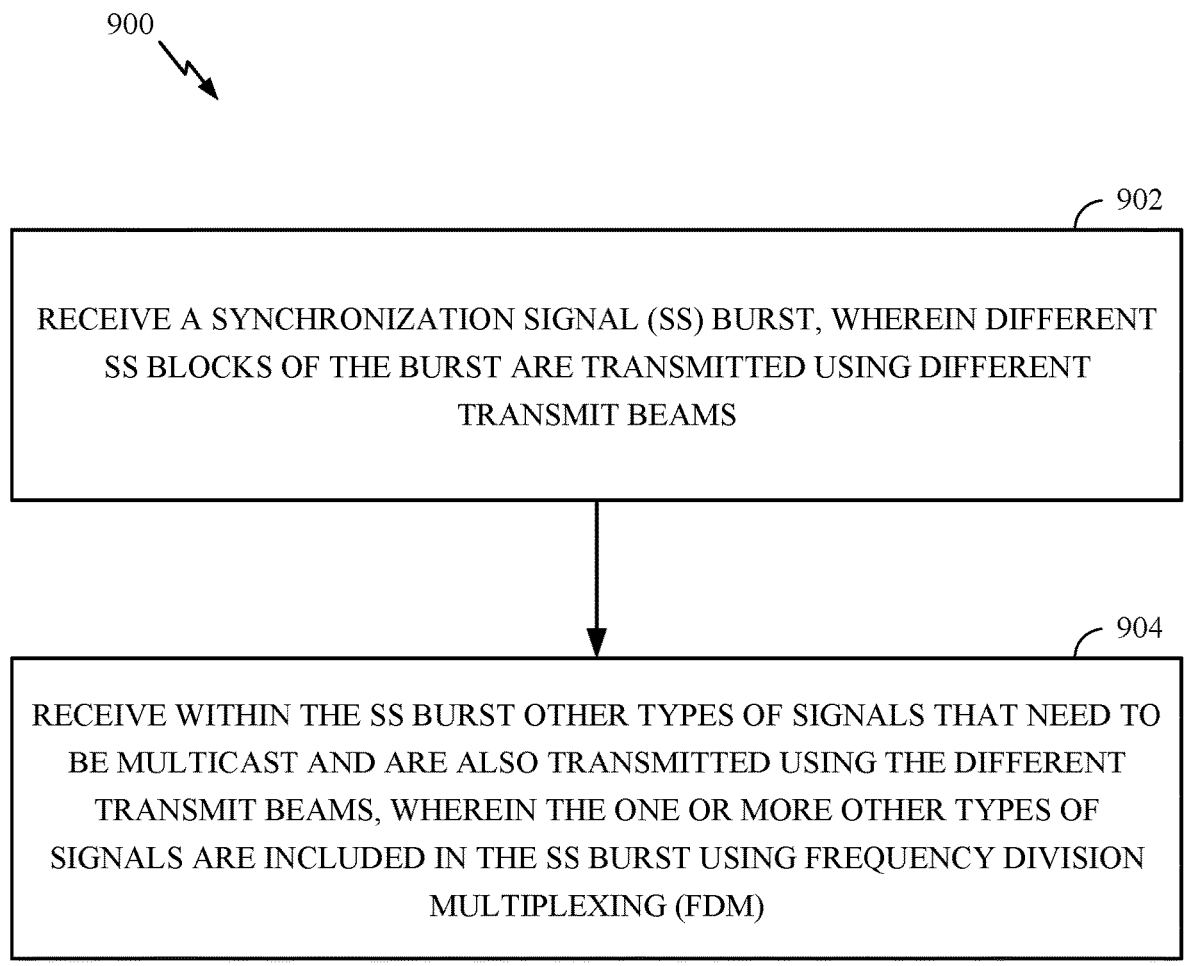
FIG. 9 illustrates example operations for a user equipment (UE) receiving the SS bursts of FIG. 8, in accordance with certain aspects of the present disclosure.

FIG. 9 illustrates example operations for a user equipment (UE) receiving the SS bursts of FIG. 8, in accordance with certain aspects of the present disclosure. Operations 900 begin, at 902, by receiving a synchronization signal (SS) burst, wherein different SS blocks of the burst are transmitted using different transmit beams. At 904, operations 900 continue by receiving within the SS burst other types of signals that need to be multicast and are also transmitted using different transmit beams, wherein the one or more other types of signals are included in the SS burst using frequency division multiplexing (FDM).

As described above, a number of techniques may be utilized to help with providing a more accurate cell quality measurement. In some embodiments, the first technique may provide a fixed power spectral density (PSD) on NR-SS, which effectively results in maintaining the transmit power, with which NR-SS is transmitted, consistent. In such embodiments, the gNB may allocate NR-SS PSD based on the worst case assumption regarding other channels to be FDM'ed. In such cases, the gNB may budget enough power to transmit all the other FDM'ed channels, even if they may not actually be transmitted in a particular SS-block. In embodiments where the other FDM'ed channels are not being transmitted, however, applying this technique may waste the gNB's power because the power reserved for other FDM'ed channels could have been used to boost the NR-SS power.

Moving now to the second technique, the second technique may provide for applying FDM to other channels (e.g. paging channel) only with the NR-SS symbols that are not used for measurements. This is possible because, under some wireless communications standards, such as NR, only some OFDM symbols in each SS-block may be used for measurements. For example, in some embodiments, the PSS waveform may be identical for multiple cells and thus PSS may not be used for measurements, while SSS is unique in each cell and may be used for measurements. As a result, in some embodiments, applying the second technique will result in no impact on the measurements. In such embodiments, the SS power fluctuations from the intermittently transmitted FDM'ed channels are deemed acceptable and the UE may not need to be informed about them because no measurements are being performed using the corresponding NR-SS symbols.

In some embodiments, the UE may be aware that the gNB is not using the first technique described above. In such embodiments, the UE may then try to infer the presence of other FDM'ed channel transmissions based on the fluctuations in SS power. In some embodiments, the gNB may signal to the UE (e.g. in MIB/mSIB/SIB/RRC/DCI) to inform the UE of whether the gNB is using the first technique. In some other embodiments, the UE may determine whether the gNB is using the first technique based on the history of observed received powers under both conditions (FDM channel present vs. absent), even though the receive power may vary based on channel variations as well.

Under the third technique, in some embodiments, only certain SS-blocks may be allowed to carry the other FDM'ed channels (e.g. paging channel). As a result, in such embodiments, certain SS-blocks may be barred by the gNB from carrying other FDM channels. In such embodiments, the UE may measure only blocks that do not carry the other FDM'ed channels. In some embodiments, the indices/time-locations of such blocks may be unknown to the UEs that are not connected to a cell or just beginning the initial cell-search. However, such UEs' measurements may not be affected by the NR-SS power fluctuations anyways because they have not begun measurements and reporting yet. Applying the third technique may be especially useful if, for example, the required periodicity of the FDM'ed transmissions is less than the periodicity of the sync channel. When receiving SS-block that are not barred from carrying the other FDM'ed channels, in some embodiments, the UE may assume that FDM data is always present and correct for power fluctuations accordingly when reporting measurements. In some embodiments, a correction factor may be signaled or configured by the gNB and transmitted to the UE.

In some embodiments, the gNB may assist the UEs in identifying barred as opposed to non-barred SS-blocks for the UE. In some embodiments, the gNB may send information relating to the identification of barred or non-barred SS blocks in separate signaling. In such embodiments, this may be configured by the gNB based on some time index (e.g. SS-block index) in MSIB (master system information block)/SIB (system inform block)/DCI (downlink control information)/RRC (radio resource control). In some other embodiments, the gNB may send the identification information to the UE in MIB (master information block)/PBCH (physical broadcast channel), i.e., as part of the SS-block itself. In such embodiments, the SS-block itself may carry information indicating whether it contains any other FDM'ed channels or not. Also, in such embodiments, this may allow even idle UEs (e.g. UEs that have not yet established a connection with a cell) to identify barred as opposed to non-barred SS-blocks. In embodiments where the SS-block carries the information described above, the UEs may need to read PBCH more often in order to identify whether the SS blocks contain other FDM'ed data.

Moving now to the fourth technique, the fourth technique relates to configuring the gNB and/or the UE to correct or adjust measurement reports provided by the UE. In some embodiments, since a gNB knows which SS-blocks contained FDM data and which SS-blocks did not, the gNB may be configured to correct for the measured power reported by the UE accordingly. In some embodiments, the gNB may perform the correction based on the relative power level of the SS-block and any FDM'ed data (such as paging) contained therein. In some embodiments, making such corrections may be less difficult when the UE's measurement report is based on per SS-block measurement, without any memory/filtering across the SS-blocks. In embodiments where there is filtering across the SS-blocks, it may be more difficult for the gNB to accurately compute the right correction factor even if the filter parameters are known to gNB.

In addition to the gNB, in some embodiments, a UE may be configured to adjust or correct the measurement reports. In order to make such corrections, in some embodiments, the UE may know or detect (e.g., autonomous detection) the power offset. In some embodiments, the gNB may signal the power offset or ratio by transmitting it in the MIB/MSIB/SIB/DCI/RRC. In yet some other embodiments, the gNB may restrict the power offset to a pre-determined quantized set to aid the UE's blind detection of the power offset. In addition to making measurement corrections using the power offset between NR-SS and another FDM'ed channel, such as a paging channel, power offset between the components of NR-SS itself. For example, a power offset between SSS and PBCH DMRS as well as a power offset between SSS and the rest of NR-SS (e.g. TSS, PBCH, etc.) may also allow the UE to use other components of NR-SS for providing more accurate measurements (as opposed to only SSS), if they use the same antenna port.

In addition to the signal power fluctuations having an impact on cell quality measurements, in some embodiments, the signal power fluctuations may also impact cell search. For example, between two cells in a UE's cell search, the cell with a weaker signal power may appear to be stronger because its SS blocks contained no FDM data while the SS blocks of the stronger cell contained FDM data. In some embodiments, the impact of the signal power fluctuations may be eliminated by implementing the first technique described above. In some embodiments, the second technique described above may also mitigate or eliminate the impact depending on which OFDM symbols are selected for FDM. For example, multiplexing using FDM may only be allowed for PBCH, in which case only PBCH decoding may be affected without cell-search being affected. In some embodiments, the third technique may also provide some mitigation. In such embodiments, some time-alignment coordination between the cells in allocating the same slot index, which may be reserved only for sync channel transmissions and no other FDM data, may increase the likelihood of the UE performing a more accurate and fair comparison of cell quality among the cells in a cell search.

In some embodiments, the fourth technique may be helpful, after the initial acquisition phase for neighboring cell reports, where some measurement report compensation or adjustment may be performed by coordinating with a neighboring cell. For example, in a neighboring cell search, the gNB may apply some adjustment or compensation to the neighboring cell reports (coordinating with the neighbor cell) and accordingly signal the UE about network-initiated handover events.

In some embodiments, all the techniques described above (technique 1 through technique 4) may be combined to mitigate or eliminate the impact of signal power fluctuations on cell quality measurements and cell research. For example, one of techniques 1 through 4 may be applied in one time window while another one of techniques 1 through 4 may be applied in another time window. In another example, technique 3 may be applied to bar some SS blocks from carrying any other FDM channel while technique 1 may be applied in SS blocks in which FDM data is allowed.

In some embodiments, instead of FDM-ing the other beam-swept channels in the same slot as NR-SS, separate slots may be defined for the other channels by applying the time division multiplexing (TDM) technique.

Figure 10:
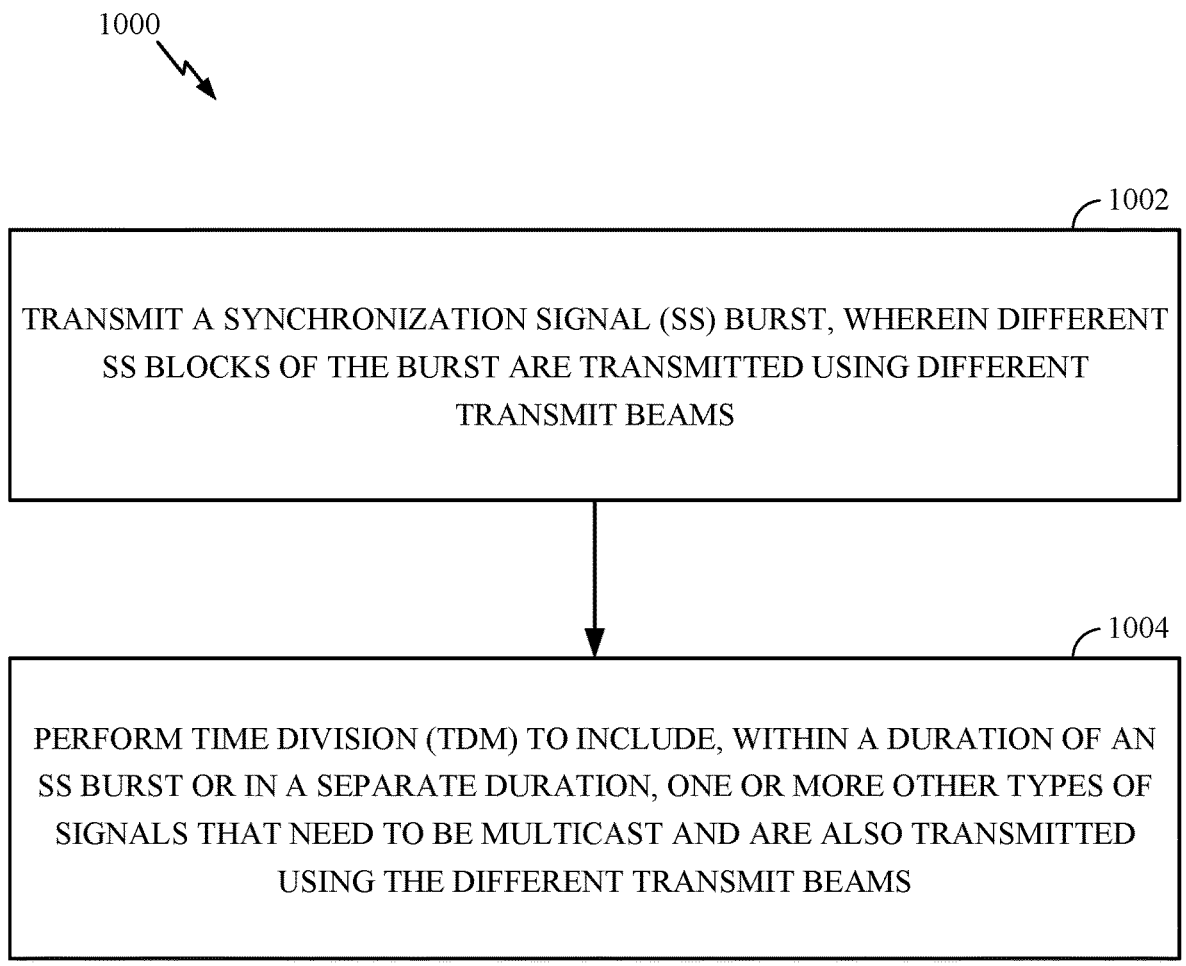
FIG. 10 illustrates example operations for a base station transmitting time division multiplexing (TDM) data within synchronization signal (SS) bursts, in accordance with certain aspects of the present disclosure.

FIG. 10 illustrates example operations for a base station transmitting TDM data within synchronization signal (SS) bursts, in accordance with certain aspects of the present disclosure. Operations 1000 begin, at 1002, by transmitting a synchronization signal (SS) burst, wherein different SS blocks of the burst are transmitted using different transmit beams. At 1004, operations 1000 continue by performing time division multiplexing (TDM) to include, within a duration of an SS burst or in a separate duration, one or more other types of signals that are also transmitted using different transmit beams.

Figure 11:
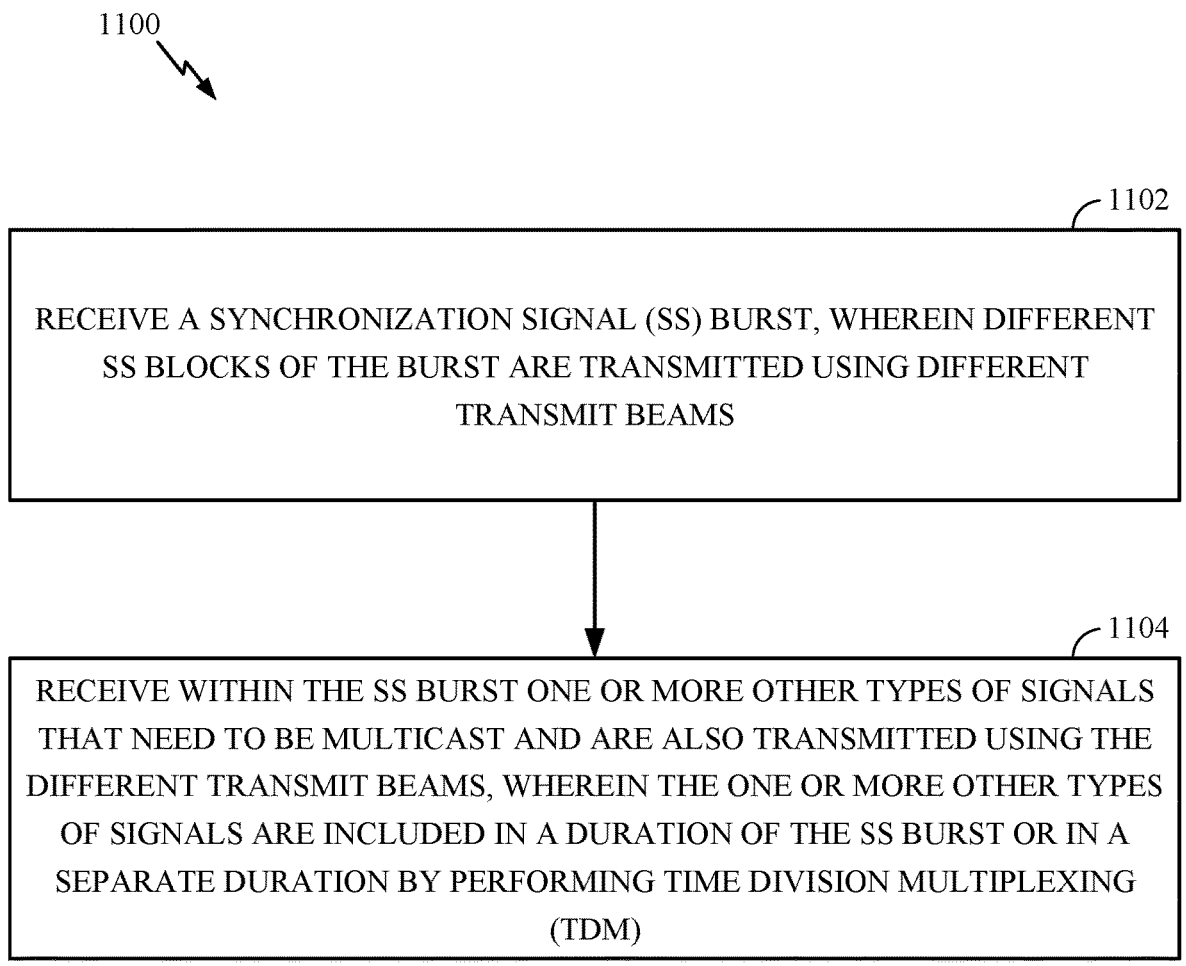
FIG. 11 illustrates example operations for a user equipment (UE) receiving the SS bursts of FIG. 10, in accordance with certain aspects of the present disclosure.

FIG. 11 illustrates example operations for a user equipment (UE) receiving the SS bursts of FIG. 10, in accordance with certain aspects of the present disclosure. Operations 1100 begin, at 1102, by receiving a synchronization signal (SS) burst, wherein different SS blocks of the burst are transmitted using different transmit beams. At 1104, operations 1100 continue by receiving within the SS burst one or more other types of signals that are also transmitted using different transmit beams, wherein the one or more other types of signals are included in a duration of the SS burst or in a separate duration by performing time division multiplexing (TDM).

As described above, an SS burst may span across a number of slots or time durations. Accordingly, instead of including both NR-SS and the other data in one time duration (FDM), in some embodiments, one or more separate slots or durations may be designated for carrying the other data (e.g., PDSCH, PDCCH), such that NR-SS and the other data may not be included in the same time duration (i.e., TDM). For example, a paging slot may be defined for transmitting pages/quick-pages/paging-indications. In some embodiments, these separately defined time slots may have their own parameters, different from those of the sync slots. For example, N number of OFDM symbols may be swept at a time, where the value of N may be different for the other beam-swept channels than the value of N for the sync slots. Defining separate slots for the other beam-swept channels (e.g. applying TDM instead of FDM), in some embodiments, may prevent peak-to-average power ratio (PAPR) degradation of sync OFDM symbols due to FDM. Accordingly, in some embodiments, the TDM technique may be preferable in situations where PAPR is more important (e.g. in 40 GHz-plus bands). The TDM technique may, in some embodiments, also allow single carrier-FDM (SC-FDM) or better PAPR for the FDM'ed data (e.g. paging) transmissions. In embodiments where TDM is applied instead of FDM, the beam-sweeping overhead (e.g. paging overhead) may be moved from the frequency domain (e.g. lost power for sync) to the time-domain (e.g. lower data throughput).

In addition, under the NR standards, in some embodiments, some SS blocks in a burst may be skipped (i.e. not transmitted). In such embodiments, the network (e.g. gNB) may inform the UE regarding which blocks are skipped. Accordingly, in such embodiments, instead of discontinuous transmission (DTX), the skipped blocks may be used to TDM other beam-swept channels such as paging.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering.

For example, means for transmitting and/or means for receiving may comprise one or more of a transmit processor 420, a TX MIMO processor 430, a receive processor 438, or antenna(s) 434 of the base station 110 and/or the transmit processor 464, a TX MIMO processor 466, a receive processor 458, or antenna(s) 452 of the user equipment 120. Additionally, means for generating, means for multiplexing, and/or means for applying may comprise one or more processors, such as the controller/processor 440 of the base station 110 and/or the controller/processor 480 of the user equipment 120.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A user equipment (UE) comprising:
   a memory; and
   a processor coupled to the memory, the memory and the processor being configured to:
      receive a synchronization signal (SS) burst, wherein a plurality of SS blocks of the SS burst are received using one or more receive beams;
      receive within the SS burst one or more other types of multicast signals that are also received using the one or more receive beams, wherein the one or more other types of multicast signals are frequency division multiplexed with the SS burst, wherein the one or more other types of multicast signals are included for only some SS blocks of the SS burst; and
      receive signaling from a base station indicating whether the SS burst includes the one or more other types of multicast signals, wherein the signaling is included in the SS burst, and the signaling further indicates, to the UE, which SS blocks include the one or more other types of multicast signals.

2. The UE of claim 1, wherein the one or more other types of multicast signals are included for only a number of symbols of an SS block of the only some SS blocks of the SS burst, wherein the number of symbols represents less than all symbols of the SS block.

3. The UE of claim 2, wherein the one or more other types of multicast signals are included for only symbols of the SS block that are not used for measurements.

4. The UE of claim 1, wherein the memory and the processor are further configured to:
   adjust a measurement procedure and a measurement report based on at least one of: which SS blocks include the one or more other types of multicast signals or available information about power ratios between consecutive symbols of the SS blocks and the one or more other types of multicast signals.

5. The UE of claim 4, wherein the memory and the processor are further configured to receive the power ratios from the base station.

6. The UE of claim 4, wherein power levels are quantized to facilitate at least one of: signaling to the UE or autonomous detection of the power levels by the UE.

7. The UE of claim 1, wherein the one or more other types of multicast signals include at least one of physical downlink control channel (PDCCH) signals or physical downlink shared channel (PDSCH) signals.

8. The UE of claim 1, wherein the one or more other types of multicast signals include physical downlink shared channel (PDSCH) signals, and wherein the SS burst is further time division multiplexed with physical downlink control channel (PDCCH) signals.

9. A base station (BS) comprising:
   a memory; and
   a processor coupled to the memory, the memory and the processor being configured to:
      transmit a synchronization signal (SS) burst, wherein a plurality of SS blocks of the SS burst are transmitted using one or more transmit beams;
      frequency division multiplex, with the SS burst, one or more other types of multicast signals that are also transmitted using the one or more transmit beams, wherein the one or more other types of multicast signals are included for only some SS blocks of the SS burst; and
      transmit signaling to a user equipment (UE), the signaling indicating whether the SS burst includes the one or more other types of multicast signals, wherein the signaling is included in the SS burst, and the signaling further indicates, to the UE, which SS blocks include the one or more other types of multicast signals.

10. The BS of claim 9, wherein the memory and the processor are further configured to allocate power spectral density (PSD) based on the one or more other types of multicast signals being included in the SS burst to maintain consistent transmit power with which the plurality of SS blocks are transmitted.

11. The BS of claim 10, wherein to allocate comprises to budget enough power to transmit the one or more other types of multicast signals.

12. The BS of claim 9, wherein the one or more other types of multicast signals are included for only a number of symbols of an SS block of the only some SS blocks of the SS burst, wherein the number of symbols represents less than all symbols of the SS block.

13. The BS of claim 12, wherein the one or more other types of multicast signals are included for only symbols of the SS block that are not used for measurements.

14. The BS of claim 9, wherein the memory and the processor are further configured to:
   coordinate with one or more neighboring base stations to increase time-alignment between SS blocks that do not carry the one or more other types of multicast signals.

15. The BS of claim 9, wherein the memory and the processor are further configured to:
   receive a measurement report from the UE; and
   adjust the measurement report based, at least in part, on which SS blocks include the one or more other types of multicast signals.

16. The BS of claim 9, wherein the memory and the processor are further configured to transmit signaling of power ratios between consecutive symbols of the SS blocks and the one or more other types of multicast signal to the UE.

17. The BS of claim 9, wherein power levels are quantized to facilitate at least one of: signaling to the UE or autonomous detection of the power levels by the UE.

18. The BS of claim 9, wherein the one or more other types of multicast signals include at least one of physical downlink control channel (PDCCH) signals or physical downlink shared channel (PDSCH) signals.

19. The BS of claim 9, wherein the one or more other types of multicast signals include physical downlink shared channel (PDSCH) signals, and wherein the SS burst is further time division multiplexed with physical downlink control channel (PDCCH) signals.

20. A user equipment (UE) comprising:
   a memory; and
   a processor coupled to the memory, the memory and the processor being configured to:

receive a synchronization signal (SS) burst, wherein a plurality of SS blocks of the SS burst are received using one or more receive beams;

receive within the SS burst one or more other types of multicast signals that are also received using the one or more receive beams, wherein the one or more other types of multicast signals are included in a duration of the SS burst or in a separate duration by performing time division multiplexing (TDM); and receive signaling from the base station (BS) indicating whether the SS burst includes the one or more other types of multicast signals, wherein:

the signaling is included in the SS burst;

a first set of parameters is used for sweeping SS blocks of the SS burst using the one or more receive beams;

a second set of parameters is used for sweeping the one or more other types of multicast signals using the one or more receive beams; and the first set of parameters and the second set of parameters define a number of symbols for a sweep.

21. The UE of claim 20, wherein the one or more other types of multicast signals comprise signals related to paging.

22. The UE of claim 20, wherein the signaling from the BS indicates one or more SS blocks of the SS burst that are skipped.

23. A base station, comprising:
a memory; and
a processor coupled to the memory, the memory and the processor being configured to:

transmit a synchronization signal (SS) burst, wherein a plurality of SS blocks of the SS burst are transmitted using one or more transmit beams;

perform time division multiplexing (TDM) to include, within a duration of the SS burst or in a separate duration, one or more other types of multicast signals that are also transmitted using the one or more transmit beams; and transmit signaling to a user equipment (UE) indicating whether the SS burst includes the one or more other types of multicast signals, wherein:

the signaling is included in the SS burst;

a first set of parameters is used for sweeping SS blocks of the SS burst using the one or more transmit beams;

a second set of parameters is used for sweeping the one or more other types of multicast signals using the one or more transmit beams; and the first set of parameters and the second set of parameters define a number of symbols for a sweep.

24. The BS of claim 23, wherein the one or more other types of multicast signals comprise signals related to paging.

25. The BS of claim 23, wherein the memory and the processor are further configured to:

skip one or more SS blocks of the SS burst, wherein the signaling indicates which SS blocks are skipped.

* * * * *